(12) United States Patent
Fujimoto et al.

(10) Patent No.: US 11,887,358 B2
(45) Date of Patent: Jan. 30, 2024

(54) SYSTEMS AND METHODS FOR IDENTIFYING AND SEGMENTING OBJECTS FROM IMAGES

(71) Applicant: Ancestry.com Operations Inc., Lehi, UT (US)

(72) Inventors: Masaki Stanley Fujimoto, Provo, UT (US); Yen-Yun Yu, Murray, UT (US)

(73) Assignee: Ancestry.com Operations Inc., Lehi, UT (US)

( * ) Notice: Subject to any disclaimer, the term of this patent is extended or adjusted under 35 U.S.C. 154(b) by 300 days.

(21) Appl. No.: 17/343,626

(22) Filed: Jun. 9, 2021

(65) Prior Publication Data

US 2021/0390704 A1 Dec. 16, 2021

Related U.S. Application Data

(60) Provisional application No. 63/037,364, filed on Jun. 10, 2020.

(51) Int. Cl.
| | |
|---|---|
| *G06V 10/82* | (2022.01) |
| *G06T 7/11* | (2017.01) |
| *G06T 3/40* | (2006.01) |
| *G06V 30/414* | (2022.01) |
| *G06V 10/32* | (2022.01) |

(Continued)

(52) U.S. Cl.
CPC ............ *G06V 10/82* (2022.01); *G06T 3/4046* (2013.01); *G06T 7/11* (2017.01); *G06V 10/32* (2022.01); *G06V 30/19173* (2022.01); *G06V 30/414* (2022.01); *G06N 3/08* (2013.01);

(Continued)

(58) Field of Classification Search
CPC ........... G06N 3/08; G06T 7/11; G06T 3/4046; G06T 2207/20021; G06T 2207/20024; G06V 10/32; G06V 10/82; G06V 30/414; G06V 30/19173
See application file for complete search history.

(56) References Cited

U.S. PATENT DOCUMENTS

2020/0402246 A1* 12/2020 Hekmatian ............... G06T 7/11

OTHER PUBLICATIONS

Xu, et al. (Automated Cattle Counting using Mak-R-CNN in Quadcopter Vision System) , pp. 1-12. (Year: 2020).*

(Continued)

*Primary Examiner* — Daniel G Mariam
(74) *Attorney, Agent, or Firm* — Keller Preece PLLC

(57) ABSTRACT

Systems and methods for identifying and segmenting objects from images include a preprocessing module configured to adjust a size of a source image; a region-proposal module configured to propose one or more regions of interest in the size-adjusted source image; and a prediction module configured to predict a classification, bounding box coordinates, and mask. Such systems and methods may utilize end-to-end training of the modules using adversarial loss, facilitating the use of a small training set, and can be configured to process historical documents, such as large images comprising text. The preprocessing module within said systems and methods can utilize a conventional image scaler in tandem with a custom image scaler to provide a resized image suitable for GPU processing, and the region-proposal module can utilize a region-proposal network from a single-stage detection model in tandem with a two-stage detection model paradigm to capture substantially all particles in an image.

20 Claims, 7 Drawing Sheets

(51) Int. Cl.
*G06V 30/19* (2022.01)
*G06N 3/08* (2023.01)
(52) U.S. Cl.
CPC .............. *G06T 2207/20021* (2013.01); *G06T 2207/20024* (2013.01)

(56) References Cited

OTHER PUBLICATIONS

Dung, et al. (Autonomous Concrete Crack Detection Using Deep Fully Convolutional Neural Network), pp. 1-7 (Year: 2018).*
Almutairi, et al. (Instance Segmentation of Newspaper Elements Using Mask R-CNN), pp. 1-5. (Year: 2019).*
Yanagisawa, et al. (A Study on Object Detection Method from Manga Images Using CNN), pp. 1-4 (Year: 2018).*
Zhang, et al. (Mask-Refined R-CNN: A Network for Refining Object Details in Instance Segmentation , pp. 1-16. (Year: 2020).*
Xiang Deng et al: "Automatic image cropping with a single fully convolutional network", Internet Multimedia Computing and Service, ACM, 2 Penn Plaza, Suite 701 New York NY 10121-0701 USA, Aug. 17, 2018, pp. 1-5, XP058415700, DOI: 10.1145/3240876.3240906 ISBN: 978-1-4503-6520-8 abstract; figure 1.
Peng Can et al: "To What Extent Does Downsampling, Compression, and Data Scarcity Impact Renal Image Analysis?", 2019 Digital Image Computing: Techniques and Applications (DICTA), IEEE, Dec. 2, 2019, pp. 1-8, XP033683056, DOI: 10.1109/DICTA47822.2019.8945813 [retrieved on Dec. 30, 2019] Section III; figures 2, 3, 6.
International Search Report for PCT/US2021/036725 dated Nov. 18, 2021, all pages.

* cited by examiner

SYSTEMS AND METHODS FOR IDENTIFYING AND SEGMENTING OBJECTS FROM IMAGES

FIELD OF THE DISCLOSURE

The disclosure relates to a system and method for identifying and segmenting objects from images, such as segmenting articles from scanned newspaper images.

BACKGROUND

Images and photos capture many elements and data of history that are otherwise completely lost to modern people. Many historical records, such as official documents like Census records, maps, phonebooks, newspapers, ledgers, passenger manifests, books, Birth, Marriage, and Death certificates, yearbooks, and other documents are preserved only, if at all, as photographed or digitized images, often in obscure and/or hard-to-locate and/or hard-to-search places.

As-yet-undigitized records may only exist in their original, perishable, and possibly damaged form, or on microfilm or microfiche in large archives. This limits access by interested persons to the information contained thereon. Even to the extent that such images are saved in electronic databases or locations, manually searching for a desired datum, moment, or event among the billions of extant records that are not scanned and processed specifically to facilitate effective text-based searching is often impossible or at least highly impractical.

Such historical records, such as newspapers, freeze a moment in time and capture day-to-day life in a way and at a scale that no other record can. Newspapers are often the only source of vital information about people, and information such as marriage announcements, obituaries, and other articles contained in old newspapers is vital for providing key and/or missing information on a person's life, such as in a genealogical context. Newspapers further provide rich context about communities of interconnected people. For this reason, being able to easily peruse and search the information contained in digitized copies of old newspapers can provide a highly meaningful experience for a user on a family history application.

Efforts have been made to provide access to online sources of scanned images, such as scanned images of newspapers, but existing object identification and segmentation modalities are not well-suited to the task of identifying segmenting individual articles within a scanned newspaper image. Many documents including newspapers are stored as scanned images with no delineation between, and consequently no organization of, the content of individual particles, such as individual articles.

Previous efforts for segmenting newspaper and other images have relied on matching content to rigid, user-generated templates. Such templates are poorly suited to the task of identifying and segmenting articles in a newspaper because no two newspaper pages, even within different issues of the same newspaper, have the same layout and each article of each issue can have a different size, shape, and configuration relative to surrounding articles. Another challenge arises from the fact that newspaper articles often begin on a specific location of one page and then continue in a different location on a different page.

Additionally or alternatively, existing modalities which are primarily geared toward identifying and segmenting images of real-world scenery such as a street or park view have been used, but such modalities are primarily used to identify objects such as people, animals, or cars. While such modalities do not require the use of a specific user-generated template, these methods of object detection and image segmentation are poorly adapted to segmenting newspaper articles because they rely on assumptions or methods that are not applicable to scanned images of newspapers.

For example, real-world images typically have a distinguishable foreground and background, well-defined borders between objects, and a relative sparsity of objects of interest, such as a small number of cars or faces. By contrast, newspapers completely or nearly completely comprise foreground, have text that is separated by ill-defined boundaries like white space, and/or have densely packed content such as small classified ads.

Faster-RCNN (Region-based Convolutional Neural Network), in particular, is suspected to perform poorly at segmenting newspapers because it prioritizes precision over recall. Faster-RCNN was developed to identify objects that may be the focal point of the image; to this end, Faster-RCNN performs a sorting operation that grabs that top k Regions of Interest (ROIs). A single instance may have many ROIs that identify it, and sorting makes the model tend toward only identifying objects/instances with a high confidence.

This can result in the model not accounting for all instances in the image. Even if the Region Proposal Network (RPN) of Faster-RCNN identifies substantially all instances, i.e. articles, in a scanned newspaper image with dozens of densely packed instances, prioritizing the top k among so many proposed regions (in some cases greater than 20,000) often results in missed instances, such as articles having fewer distinguishing features relative to the identified articles. For example, Faster-RCNN may entirely miss smaller articles that are adjacent to prominent articles.

Additionally, Faster-RCNN only identifies rectangular bounding boxes. Not all desired instances, e.g. newspaper articles, are rectangular; rather, some articles start at the bottom of a column and are continued at the top of a different column, for example. The labeled data available identifies "sub-particles" which are sub-parts of particles, a particle being, for example, an entire article identified in a single newspaper image. In Faster-RCNN, sub-particles for a particle have been algorithmically broken into their own particle if they are not contiguous regions of the image and far enough apart defined by a threshold. This results in poor performance by Faster-RCNN and similar approaches on non-contiguous particles identified in many documents, such as newspapers.

Mask-RCNN is an extension of Faster-RCNN that adds a third, parallel task to the Faster-RCNN model architecture to create a per-pixel mask for each identified instance. This approach, however, remains limited by missed instances as the mask head of Mask-RCNN is simply an additional task on top of Faster-RCNN, and thus suffers from the same limitations as other RCNN-based approaches to segmentation vis-a-vis text-specific images such as historical documents. That is, Mask-RCNN is still prone to missing important instances.

While real-world images lend themselves well to pre-processing algorithms that render the images small enough for processing on a Graphics Processing Unit ("GPU"), text-based images such as newspaper images, by contrast, do not downscale well using existing pre-processing methods, as such methods render much of the scanned text unreadable.

That is, the ease with which images of real-world scenery can be downsampled (i.e., reduced in size) for processing by or in a Graphics Processing Unit using existing interpolation algorithms such as Mipmap, Box Sampling, Sinc, and equivalents does not work well with scanned images of newspapers, which tend to be relatively large (e.g., 2500× 5000 pixels) and are text-dense. Existing downsampling modalities are designed to maintain high fidelity to an input image but are not designed with text-based images in mind.

As a result, newspapers and other historical documents are a unique challenge as there is no obvious way to downsample the scanned images (which is necessary because of the large image size of historical documents, particularly scanned images of newspapers) while retaining the necessary granularity of the dense text, which is often entirely foreground and not distinct in ways that existing modalities can recognize.

As a result, many historical records, such as scanned newspapers which may be high-resolution and/or text-dense, are poorly served by existing object detection and segmentation methods, rendering such records unreadable and unusable in many contexts.

From the foregoing, the state of the art of image segmentation and object detection techniques results in poor objection detection and segmentation of documents, including newspapers, with articles being missed entirely and mistakenly being broken up. There is a need for a system and/or method for identifying and segmenting objects from images that overcomes one or more of the above-mentioned limitations of existing approaches.

SUMMARY

Embodiments of a system and method for identifying and segmenting objects from images according to the disclosure advantageously overcome one or more limitations of existing object identification and segmentation modalities. Embodiments provide an improved method of learned imaged scaling, region proposing, and/or custom loss functions for improved segmentation output. The system and method embodiments of the disclosure advantageously address the problem of existing object detection and segmentation approaches being poorly adapted to properly downsampling images, such as images comprising text, to capturing all particles, and/or to correctly identifying particles and corresponding sub-particles.

In an embodiment, the system and method include an image preprocessing module and/or step. The image preprocessing module comprises and/or is configured to cooperate with an image-resizing algorithm, such as a conventional image resizing algorithm, and/or a custom resizing algorithm to receive an image, such as a red-green-blue (RGB) image, and to reduce a size of the image. The conventional image-resizing algorithm is a conventional downsampling interpolation algorithm. For example, the image-resizing algorithm may be a Nearest Neighbor resampling algorithm, a Bilinear resampling algorithm, a Hermite resampling algorithm, a Bell resampling algorithm, a Mitchell resampling algorithm, a Bicubic resampling algorithm, a Lanczos resampling algorithm, combinations or equivalents thereof, or any other suitable downsampling algorithm, including resampling algorithms known to skilled persons.

While application of the system and method embodiments to RGB images has been described, it will be appreciated that any suitable image type may be utilized, including but not limited to binary images, indexed images, grayscale images, truecolor images, high dynamic range ("HDR") images, multispectral and hyperspectral images, label images, hue saturation value ("HSV") images, YIQ images, YCbCr images, CIE 1976 XYZ and CIE 1976 L*a*b* images, or any other suitable type of image.

The custom resizing algorithm, provided in embodiments distinct from and in parallel to the image-resizing algorithm, is a neural network that outputs a filter specific to an input image. The neural network is trained to learn features important to article segmentation in classes of documents. In the case of newspapers, the neural network is configured to generate the filter on the basis of, for example, bolded text, dividing lines, and/or whitespace, which may be lost during conventional downsampling processes.

In an embodiment, the neural network is a convolutional neural network (CNN) having one or more layers. The CNN utilizes a large kernel size, for example a 7×7 kernel used throughout the resizing network, and a limited number of channels, for example three channels. While three channels have been described, another quantity of channels may be utilized as suitable, for example up to 20 channels, which may advantageously reduce the memory requirements and compute time necessitated by the relatively larger kernel size. The CNN also utilizes a relatively large stride, for example, five. The use of the relatively large stride advantageously reduces the size of the image. Additionally, the use of a large stride reduces the memory usage and computation time needed. The combination of a kernel size of 7×7 with a stride of five further facilitates some overlap in the kernels. In embodiments, the stride size is less than the kernel size to maintain overlap.

Whereas in existing downsampling modalities the kernel size is reduced to, for example, 3×3 after the first layer to reduce memory requirements and compute time, the CNN advantageously retains the large kernel size, e.g. 7×7, in one or more layers subsequent to the first layer. While a 7×7 kernel size has been described, it will be appreciated that any suitable kernel size may be used for the first layer and subsequent layers of the CNN. Further, while a stride of five has been described, it will be appreciated that another suitable stride may be utilized as suitable.

The neural network defining the custom resizing algorithm is configured to output a filter, in embodiments a three-channel static image. The system and method embodiments, including the custom resizing neural network, are trained end-to-end to ensure that the filter contains information specific or important to text identification otherwise lost during conventional downsampling. The training set comprises training images, validation images, and test images.

The training images comprise approximately 4,000 labeled ground-truth images with approximately 500 images for validation and 500 images for testing. More or fewer images may be used. Because of the size of images of historical documents such as newspapers, which limits training to a single image in a batch to the GPU requirements, the system and method is vulnerable to unstable training. For this reason, the method and system embodiments include, in some embodiments, hyperparameter tuning to ensure stable, albeit slower, learning.

The filter is combined with the output of the conventional image-resizing algorithm and the combined outputs are fed to a segmentation model. By providing a filter using the neural network in combination with the conventional image-resizing algorithm output, the features of an image of a historical document, such as bolded text, white space, dividing lines, and/or other features, can be utilized while still downsampling the image sufficiently for processing within available memory, such as GPUs.

Gradient accumulation is used in embodiments to overcome the small batch size issues. In particular, applying gradient accumulation advantageously facilitates the use of small batch sizes in the system and method embodiments by modifying model weights after n batch ingredients have been calculated and summed together. Whereas ordinarily weights are modified after each batch (which can lead to unstable training if a batch contains only a single, outlier instance), gradient accumulation facilitates summing the gradients from multiple batches to make it seem as though it was one large batch, thereby mitigating the effects of outliers. While in embodiments this can require slower training as several batches are processed prior to modifying model weights, the use of gradient accumulation facilitates the small batch sizes while retaining a stable, effective training process.

Additionally or alternatively, in an embodiment the system and method include an object-proposal module. The object-proposal module comprises and/or is configured to cooperate with a novel region-proposing algorithm. The novel region-proposing algorithm advantageously utilizes different image-segmentation paradigms. The novel region-proposing algorithm is adapted from a standard region-proposing algorithm, such as a RPN based on a suitable modality, such as Mask-RCNN.

Whereas Mask-RCNN, on its own, operates on a single image-segmentation paradigm and is a two-stage detector, the novel region-proposing algorithm advantageously combines Mask-RCNN with a distinct image-segmentation paradigm. In a preferred embodiment, Mask-RCNN is modified with a You Only Look Once (YOLO)-based algorithm, a single-stage detector. While RCNN-based algorithms have been described, it will be appreciated that any two-stage detection architecture may also be used and is contemplated within the disclosure. Similarly, within two-stage architectures, different region-proposal networks may be utilized and collated in the first stage before sending output to the second stage. Likewise, it will be appreciated that a fully convolutional one-stage object detection ("FCOS") modality may alternatively or additionally be utilized. In embodiments, the FCOS modality is modified to create a bounding box space representation of the image labels for training.

It has been surprisingly found that by synergistically combining distinct region-proposal paradigms, the problem of existing region-proposal approaches misidentifying or altogether missing important components of historical documents, such as entire articles, is addressed. The problem of certain paradigms which prioritize precision over recall is addressed by synergistically leveraging the grid approach of a YOLO-based algorithm with the filtering precision of a RCNN-based algorithm, such as Mask-RCNN. In embodiments, other models having different paradigms may be combined as suitable. Thus, for example, a two-stage region detection modality may be modified with a FCOS modality. A single algorithm with a single paradigm, a combination of algorithms with two paradigms, or three or more paradigms may be used singly, in series, and/or in combination according to embodiments of the disclosure.

The grid approach of the YOLO-based algorithm, for example YOLOv5, has been surprisingly found to better represent the distribution of articles on a newspaper image, while the high-precision filtering of the RCNN-based algorithm proposes regions for prominent articles, e.g. articles with prominent features, with high accuracy. The region-proposing algorithm advantageously In an embodiment, the Mask-RCNN algorithm is based on Facebook's PyTorch Mask-RCNN implementation due to the modularity of the code. The YOLO-based algorithm is added to modify the masking branch of the Mask-RCNN. Whereas Mask-RCNN conventionally performs masking, i.e. per-pixel binary labeling, using a fully convolutional neural network ("FCN"), the region-proposing algorithm of system and method embodiments advantageously modifying the masking module of Mask-RCNN to predict bounding boxes instead of per-pixel labeling.

YOLO-based algorithms rely on a niche feature extraction network called Darknet. In embodiments, instead of using Darknet, the region-proposing algorithm augments the region-proposal network ("RPN") in Mask-RCNN with a YOLO-based RPN module. The YOLO-based RPN receives, as an input, the last feature map of the feature extraction layer. In an embodiment, the YOLO-based RPN module utilizes or comprises a ResNet-101 backbone with a Feature Pyramid Network ("FPN"). The YOLO-based RPN operates in parallel with the Mask-RCNN RPN. In embodiments, the YOLO-based RPN module replaces rather than augments the Mask-RCNN RPN.

While ResNet-101 has been described, Darknet may likewise alternatively be used. Other feature extractor networks may likewise be utilized as suitable, for example AlexNet, VGG, Resnet, SqueezeNet, DenseNet, Inception v3, GoogLeNet, ShuffleNet v2, MobileNetV2, MobileNetV3, ResNeXt, Wide ResNet, MNASNet, combinations thereof, or any other suitable modality. Pre-trained networks, for example those trained on imagenet which is a large database, often advantageously enforce the system and method to learn good, low-level feature extractors that can be used with historical documents such as newspapers despite the fact that imagenet mostly contains images that are not historical documents and differ significantly therefrom. In embodiments, only the grid-based object assignment features of YOLO-based RPN modules are utilized.

The YOLO-based RPN module advantageously predicts x and y offsets as well as a width and a height. Unlike conventional YOLO-based algorithms, however, the YOLO-based RPN module of the system and method embodiments predicts a width and height that are percentages of the image's original dimensions. YOLO9000, by contrast, predicts a non-linear scaling factor for anchor box priors. It has been found that by predicting width and height as a function, e.g. a percentage or other proportion, of the original dimensions of the image according to embodiments of the disclosure, the training of the region-proposing algorithm is much more stable. It is thought that predicting between 0 and 1 (e.g. a function or proportion of the original dimensions) is easier than predicting between, for example, 0 and 5000 px for a large image of a historical document such as a newspaper, and as a result this modification makes training easier, based on the dimensions of the model.

The novel region-proposing algorithm of embodiments of the disclosure advantageously utilizes coordinates outputted from the RPN module, in embodiments a YOLO-based RPN module, to propose regions based on an overlaid grid, with each instance, e.g. article, assigned to a particular grid cell of the overlaid grid. That is, each grid cell is responsible for creating a region proposal in the form of one or more bounding boxes and masks. After region proposals have been outputted from the RPN module, refinement of the x, y coordinates and width, height dimensions is performed.

The object or objects detected are classified into a type of object and a mask is created for the image comprising regions corresponding to identified particles and subparticles. The generated bounding boxes and masks are compared to hand-labeled bounding boxes and masks to determine whether the region-proposing algorithm can distinguish between the two, an adversarial loss process. If the region-proposing algorithm is able to distinguish between generated outputs and true labels, the novel region-proposing algorithm, in embodiments the bounding box regressor in particular, is adjusted to generate output that more closely resembles the true labels.

It has been surprisingly found that by utilizing a generative task for segmentation with the addition of adversarial loss for making adjustments to the system and method embodiments, the novel region-proposing algorithm can advantageously facilitate accurate region proposal and identification despite a small training dataset, e.g. a few thousand images only rather than millions of labeled images. This makes the system and method embodiments especially applicable and valuable when processing new types and collections of images, such as historical documents.

Providing an adversarial loss adjustment procedure advantageously allows for the use of a smaller dataset for training the system and method embodiments, as a dataset comprising only a few thousand images can be used to accurately train the system and method rather than requiring several million labeled images per existing models.

These and other features of the present disclosure will become better understood regarding the following description, appended claims, and accompanying drawings.

BRIEF DESCRIPTION OF THE DRAWINGS

FIG. 9 shows text-based images before and after downsampling using existing downsampling modalities.

Figure 1:
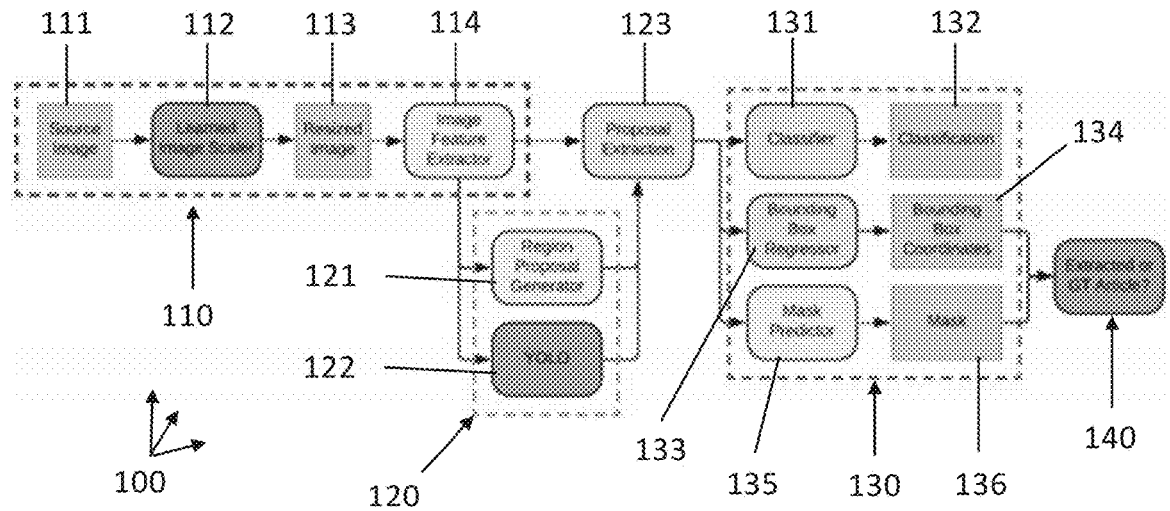
FIG. 1 is a diagram of an architecture of a system and method for identifying and segmenting objects according to an embodiment of the present disclosure.

The drawing figures are not necessarily drawn to scale, but instead are drawn to provide a better understanding of the components, and are not intended to be limiting in scope, but to provide exemplary illustrations. The drawing figures, which are included to provide a further understanding of the disclosure, are incorporated in and constitute a part of this specification, illustrate embodiments of the disclosure and together with the detailed description serve to explain the principles of the disclosure.

No attempt is made to show structural details of the disclosure in more detail than may be necessary for a fundamental understanding of the disclosure and various ways in which it may be practiced. The figures illustrate exemplary configurations of a system and method for identifying and segmenting objects from images, and in no way limit the structures or configurations of a system and method for identifying and segmenting objects from images and components thereof according to the present disclosure.

DETAILED DESCRIPTION OF VARIOUS EMBODIMENTS

A. Introduction

Although the embodiments of the disclosure are adapted for identifying and segmenting objects from images, particularly historical documents, the embodiments of the disclosure may also be dimensioned to accommodate different types, shapes and uses of images. For example, the embodiments of the disclosure may be applied to natural scenery images such as utilized in self-driving vehicles, smart video surveillance, facial recognition, people counting applications, combinations thereof, or any other suitable context.

In the following description, various examples will be described. For purposes of explanation, specific configurations and details are set forth in order to provide a thorough understanding of the examples. However, it will also be apparent to one skilled in the art that the example may be practiced without the specific details. Furthermore, well-known features may be omitted or simplified in order not to obscure the embodiments being described.

A better understanding of different embodiments of the disclosure may be had from the following description read with the accompanying drawings in which like reference characters refer to like elements. While the disclosure is susceptible to various modifications and alternative constructions, certain illustrative embodiments are in the drawings and are described below. It should be understood, however, there is no intention to limit the disclosure to the embodiments disclosed, but on the contrary, the intention covers all modifications, alternative constructions, combinations, and equivalents falling within the spirit and scope of the disclosure. Unless a term is defined in this disclosure to possess a described meaning, there is no intent to limit the meaning of such term, either expressly or indirectly, beyond its plain or ordinary meaning.

Reference characters are provided in the claims for explanatory purposes only and are not intended to limit the scope of the claims or restrict each claim limitation to the element in the drawings and identified by the reference character.

For ease of understanding the disclosed embodiments of a system and method for identifying and segmenting objects from images, certain modules are described independently. The modules may be synergistically combined in embodiments to provide a system and method for identifying and segmenting objects from images, particularly images unsuited for conventional image-segmentation approaches and/or for which conventional image-segmentation approaches yield subpar results for particular contexts.

B. Embodiments of System and/or Methods for Identifying and Segmenting Objects from Images Turning to FIG. 1, an architecture of a system 100 for identifying and segmenting objects from images is shown and described. The system 100 includes a preprocessing module 110, a region-proposal module 120, and a predictions module 130. The system 100 is configured to utilize one or more of the preprocessing module 110, the region-proposing module 120, and the predictions module 130 to identify and/or segment objects within a source image 111. The system 100 is configured in embodiments for identifying and segmenting objects from historical documents, which may lack a distinct foreground and background, may have a plurality of text-heavy particles, may have well-defined borders that separate objects, may have a sparsity of objects, and/or may be large files, e.g. 2500×5000 pixels. While historical documents have been described, it will be appreciated that the system and method embodiments described herein likewise may be applied to any suitable context and/or use, including of natural scenery images such as those used for autonomous vehicles, security systems, etc.

The preprocessing module 110 comprises a learned image scaler 112 configured to downsample the source image 111 and to yield a resized image 113. The learned image scaler 112 is configured, for example, to take a large image, e.g. 2500×5000 pixels, and to rescale the image to a size compatible with ordinary GPU processing. The learned image scaler 112 is configured to utilize a conventional downsampling algorithm, for example a Nearest Neighbor, Bilinear, Hermite, Bell, Mitchell, Bicubic, or Lanczos algorithm, equivalents thereof, or any other suitable downsampling modality. Such algorithms are generally well adapted to the nuances of natural scenery images, with comparatively few objects to identify and segment and distinct features, as described above. While conventional image scaling modalities are contemplated, it will be appreciated that custom image scaling modalities are likewise contemplated, such as modifications to existing image scaling algorithms or the use of custom-built algorithms altogether.

Figure 9:
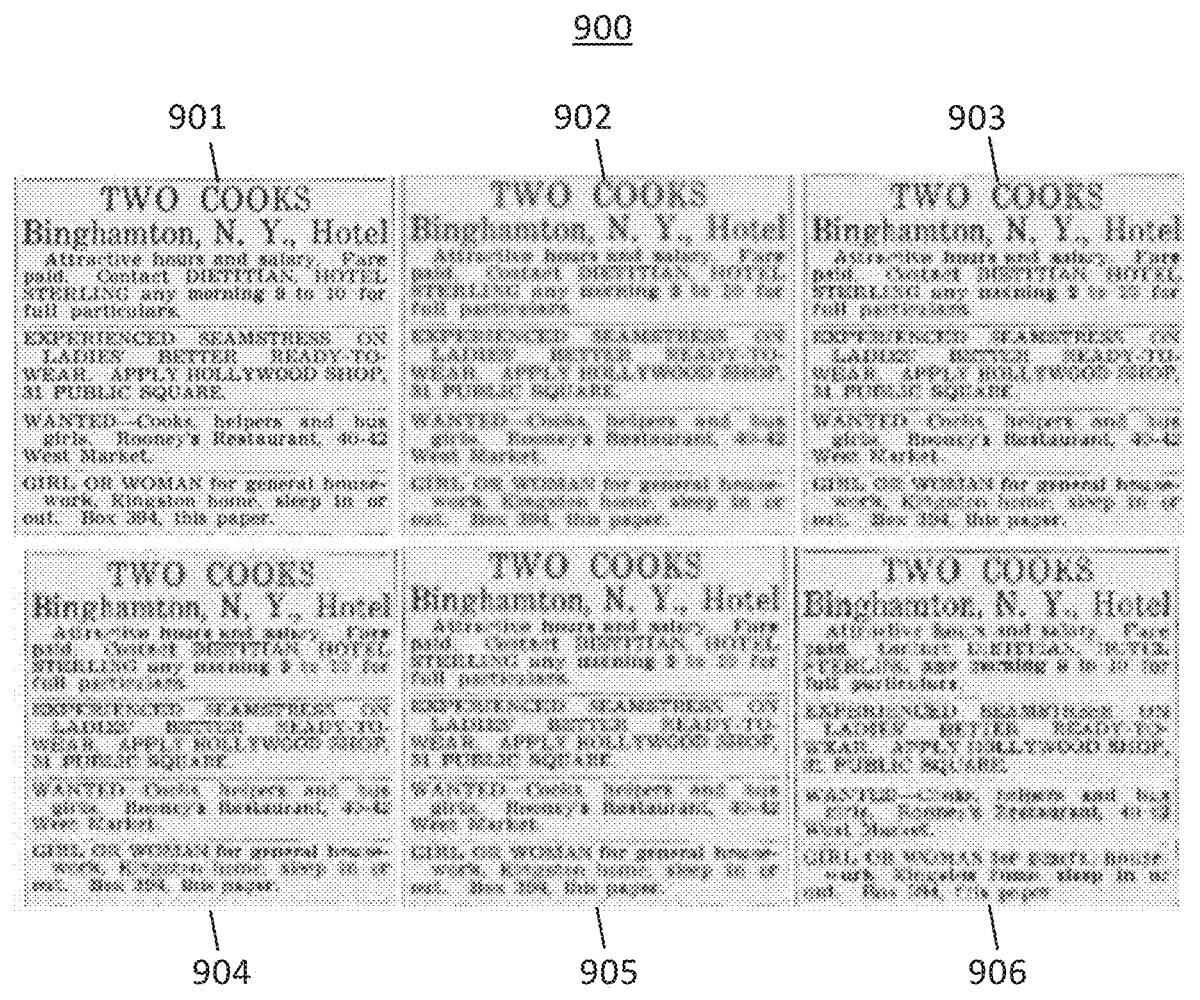

As seen in FIG. 9, utilizing only a conventional downsampling modality on text-specific images almost always leads to significant degradation of the pertinent text information. An example comparison 900 of text-specific images treating using conventional downsampling modalities is shown. A raw image 901 having a size of 3524×2520 pixels is fed through various algorithms, including existing and conventional Area, Cubic, Lanczos4, Linear, and Nearest Neighbor downsampling algorithms, corresponding to images 902, 903, 904, 905, 906, respectively, to a final size of 1409×1008 pixels. As seen, the existing modalities for downsampling text-specific images results in degradation of the text to the point of being mostly or entirely unreadable, to a human or a machine.

The learned image scaler 112 is configured to, in parallel with the conventional downsampling interpolation algorithm, utilize a custom downsampling algorithm. The custom downsampling algorithm is a machine learning algorithm. The machine learning algorithm, provided in embodiments distinct from and in parallel to the image-resizing algorithm, is a neural network that outputs a filter specific to an input image. The neural network is trained to learn features important to article segmentation in classes of documents. In the case of newspapers, the neural network is configured to generate the filter on the basis of, for example, bolded text, dividing lines, and/or whitespace, which may be lost during conventional downsampling processes. In an embodiment, the neural network is a convolutional neural network (CNN) having one or more layers.

The CNN utilizes a large kernel size, for example a 7×7 kernel used throughout the resizing network, and a limited number of channels, for example three channels. While three channels have been described, another quantity of channels may be utilized as suitable, for example up to 20 channels, which may advantageously reduce the memory requirements and compute time necessitated by the relatively larger kernel size. The CNN also utilizes a relatively large stride, for example, five. The use of the relatively large stride advantageously reduces the size of the image. Additionally, the use of a large stride reduces the memory usage and computation time needed. The combination of a kernel size of 7×7 with a stride of five further facilitates some overlap in the kernels. In embodiments, the stride size is less than the kernel size to maintain overlap.

Whereas in existing downsampling modalities the kernel size is reduced to, for example, 3×3 after the first layer to reduce memory requirements and compute time, the CNN advantageously retains the large kernel size, e.g. 7×7, in one or more layers subsequent to the first layer. While a 7×7 kernel size has been described, it will be appreciated that any suitable kernel size may be used for the first layer and subsequent layers of the CNN. Further, while a stride of five has been described, it will be appreciated that another suitable stride may be utilized as suitable.

The neural network is configured to output a filter, in embodiments a three-channel static image. The system 100, including the neural network, is trained end-to-end in embodiments to ensure that the filter contains information specific or important to text identification otherwise lost during conventional downsampling. The filter is combined with the output of the conventional image-resizing algorithm and the combined outputs are fed to a segmentation model.

By providing a filter using the neural network in combination with the conventional image-resizing algorithm output, the features of an image of a historical document, such as bolded text, white space, dividing lines, and/or other features, can be utilized while still downsampling the image sufficiently for processing within available memory, such as GPUs. While end-to-end training, e.g. simultaneous single-phase training, has been described, it will be appreciated that in embodiments, separate and optionally asynchronous training phases for distinct modules of the system 100 may also be used and are contemplated as part of the present disclosure.

The combined output of the conventional downsampling algorithm and the custom machine learning algorithm is the resized image 113, which advantageously has a reduced size compared to the source image 111 while retaining features specific and/or important to text-based tasks. While downsampling has been described, it will be appreciated that upsampling operations are likewise contemplated within the scope of the disclosure. Likewise, while parallel processing of the source image 111 through the conventional downsampling algorithm and the custom machine learning algorithm of the learned image scaler 112 has been described, it will be appreciated that processing the source image 111 by one or more suitable algorithms in series is contemplated. Further, it will be appreciated that the depicted algorithms are merely exemplary and that any suitable procedure or modality may be used in any order or number. For instance, additional downsampling algorithms may additionally be utilized as suitable.

Figure 3:
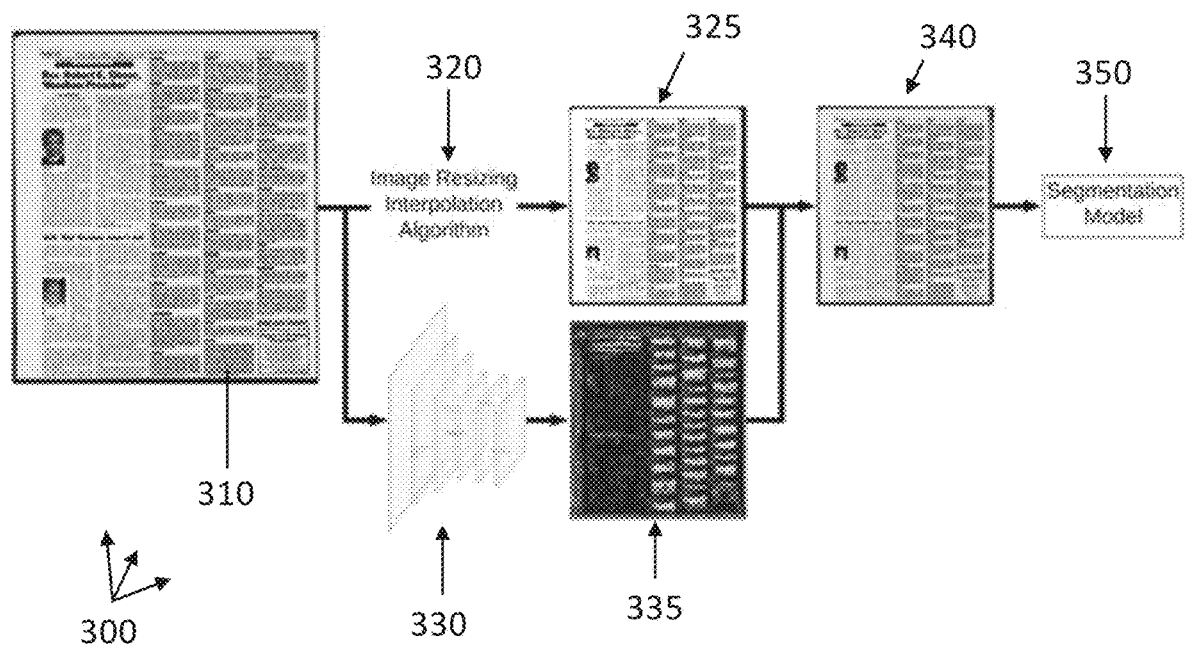
FIG. 3 is a diagram of an architecture of a learned image scaler of a system and method for identifying and segmenting objects according to an embodiment of the present disclosure.

Turning to FIG. 3, the architecture of the learned image scaler 112 is shown and described in greater detail. The learned image scaler 112 has an architecture 300, in which a raw image 310 of, for example, a historical document such as a newspaper page, is appropriately sized for later processing, such as for region proposal and classification. The raw image 310 is fed to a conventional, off-the-shelf ("OTS") image resizing interpolation algorithm 320 configured to output a resized image 325, and to a custom machine learning algorithm 330. The custom machine learning algorithm 330 is a convolutional neural network ("CNN") trained and configured to output a filter 335 comprising features specific to historical documents as described above. The filter 335 comprises a three-channel static image. The resized image 325 and the filter 335 are combined to yield a resized image suitable for providing to a segmentation model 350.

An image feature extractor module 114 then operates on the resized image 113 to extract a feature map, as known to persons skilled in the art. The feature map is independently sent to the region proposal module 120 and to a proposal extraction module 123. The region proposal module 120 advantageously utilizes distinct paradigms from different region-proposal models. In an exemplary embodiment, the novel region-proposing module 120 is adapted from a standard region-proposing algorithm, such as a RPN based on a suitable modality, e.g. Mask-RCNN.

Whereas Mask-RCNN, on its own, operates on a single image-segmentation paradigm and is a two-stage detector (with distinct region-proposal and class-prediction stages), the novel region-proposing algorithm advantageously combines a Mask-RCNN module 121 with a module 122 utilizing a distinct image-segmentation paradigm. In a preferred embodiment, the Mask-RCNN module 121 is modified with a module 122 utilizing a You Only Look Once (YOLO)-based algorithm, which is a single-stage detector.

The Mask-RCNN module 121 and the YOLO-based module 122 are utilized in parallel, in embodiments simultaneously. It will be appreciated, however, that this is not required and that the Mask-RCNN module 121 and the YOLO-based module 122 may be utilized in series and/or at different times and/or stages of the image segmentation process. It will be also be appreciated that the disclosure is in no way limited to RCNN-based, YOLO-based, and combinations of RCNN-based and YOLO-based approaches, but rather may utilize any suitable number, combination, and configuration of image-segmentation modalities.

That is, while RCNN-based and YOLO-based algorithms have been described, it will be appreciated that any two-stage detection architecture may also be used instead of Mask-RCNN and is contemplated within the disclosure. Similarly, within two-stage architectures, different region-proposal networks may be utilized and/or collated in the first stage before sending output to the second stage. Likewise, it will be appreciated that a fully convolutional one-stage ("FCOS") object detection model may alternatively or additionally be utilized instead of YOLO-based modalities. In embodiments, the FCOS modality is modified to create a bounding box space representation of the image labels for training.

It has been surprisingly found that by synergistically combining distinct region-proposal paradigms, the problem of existing region-proposal approaches misidentifying or altogether missing important components of historical documents, such as entire particles/articles, is addressed. The problem of certain paradigms which prioritize precision over recall, such as RCNN-based algorithms, is addressed in embodiments of the disclosure. That is, in embodiments the drawbacks of individual models are overcome by synergistically leveraging the grid approach of a YOLO-based algorithm with the filtering precision of a RCNN-based algorithm, such as Mask-RCNN. In embodiments, other models having different paradigms may be combined as suitable, such as a two-stage detection modality modified with a FCOS modality. A single algorithm with a single paradigm, a combination of algorithms with two paradigms, or three or more paradigms may be used singly, in series, and/or in combination according to embodiments of the disclosure.

The grid approach of the YOLO-based algorithm, for example YOLOv5, has been surprisingly found to better represent the distribution of articles on a newspaper image, while the high-precision filtering of the RCNN-based algorithm proposes regions for prominent articles, e.g. articles with prominent features, with high accuracy. The region-proposing algorithm advantageously facilitates the acquisition, segmentation, and use of historical documents that have heretofore been difficult if not impossible to process using automated methods, that is without the use of a person manually indexing the documents, due to the large image sizes, dense text, and other factors mentioned previously, while overcoming the limitations of individual algorithms as applied to historical documents, such as the propensity of RCNN-based algorithms, which prioritize precision over recall, to miss less-prominent particles and to poorly account for non-rectangular particles.

In an embodiment, the Mask-RCNN module 121 is based on Facebook's PyTorch Mask-RCNN implementation due to the modularity of Facebook's PyTorch code. The YOLO-based module 122 is added to modify the masking branch of the Mask-RCNN module 121. Whereas Mask-RCNN conventionally performs masking, i.e. per-pixel binary labeling, using a fully convolutional neural network ("FCN"), the region-proposing module 120 of system and method embodiments of the disclosure advantageously modifying the masking module of the Mask-RCNN module 121 to predict bounding boxes instead of per-pixel labeling.

YOLO-based algorithms rely on a niche feature extraction network called Darknet. Instead of using Darknet, the region-proposing module 120 replaces the region-proposal network ("RPN") in the Mask-RCNN module 121 with a YOLO-based RPN module 122. The YOLO-based RPN module 122 receives, as an input, the last feature map of the feature extraction layer or module 114. In an embodiment, the YOLO-based RPN module 122 utilizes or comprises a ResNet-101 backbone with a Feature Pyramid Network ("FPN"). The YOLO-based RPN operates in parallel with the Mask-RCNN RPN. In embodiments, the YOLO-based RPN module replaces rather than augments the Mask-RCNN RPN.

A ResNet-50 or ResNext-101 backbone may alternatively be used in embodiments. In yet other embodiments, Darknet may alternatively be used. Other feature extractor networks may likewise be utilized as suitable, including, for example, AlexNet, VGG, Resnet, SqueezeNet, DenseNet, Inception v3, GoogLeNet, ShuffleNet v2, MobileNetV2, MobileNetV3, ResNeXt, Wide ResNet, MNASNet, combinations thereof, or any other suitable modality. Pre-trained networks, for example those trained on imagenet which is a large database, have been found in embodiments to advantageously enforce the system and method to learn good, low-level feature extractors that can be used with historical documents such as newspapers, despite the fact that imagenet mostly contains images that are not historical documents. In embodiments, only the grid-based object assignment features of YOLO-based RPN modules are utilized.

The YOLO-based RPN module 122 advantageously predicts x and y offsets as well as a width and a height. Unlike conventional YOLO-based algorithms, however, the YOLO-based RPN module 122 of the system and method embodiments predicts a width and height that are proportions, e.g. percentages, of the original dimensions of the source image 111. Additionally or alternatively, the width and height are predicted as proportions of the resized image 113. YOLO9000, by contrast, predicts a non-linear scaling factor for anchor box priors. It has been found that by predicting width and height for the bounding boxes as a function or proportion, e.g. a percentage, of the original dimensions of the image according to embodiments of the disclosure, the training of the region-proposing algorithm is much more stable. It is thought that predicting between 0 and 1 (e.g. a function or proportion of the original dimensions) is easier than predicting between, for example, 0 and 5000 px for a large image of a historical document such as a newspaper, and as a result this modification makes training easier, based on the dimensions of the model.

The novel region-proposing module 120 of embodiments of the disclosure advantageously utilizes coordinates outputted from the RPN module 122, which in an exemplary embodiment is based on the YOLO family of algorithms, to propose regions based on an overlaid grid, with each instance, e.g. article, assigned to a particular grid cell of the overlaid grid. That is, each grid cell is responsible for creating a region proposal in the form of one or more bounding boxes and masks. After region proposals have been outputted from the RPN module, refinement of the x, y coordinates and width, height dimensions is performed.

Figure 4:
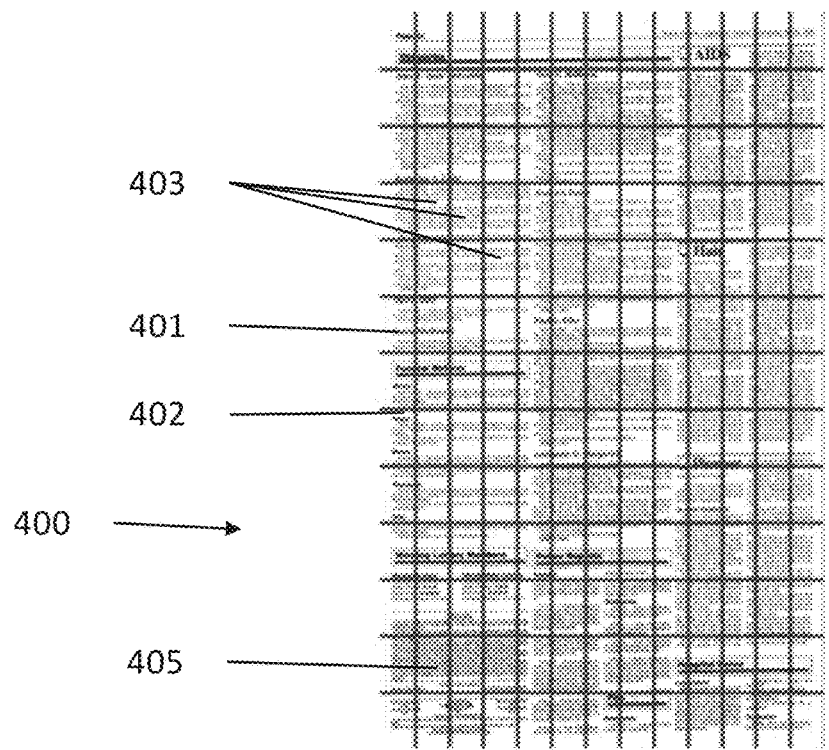
FIG. 4 is an image over which a grid has been overlaid per a YOLO-based region-proposal network according to an embodiment of the present disclosure.
Figure 5:
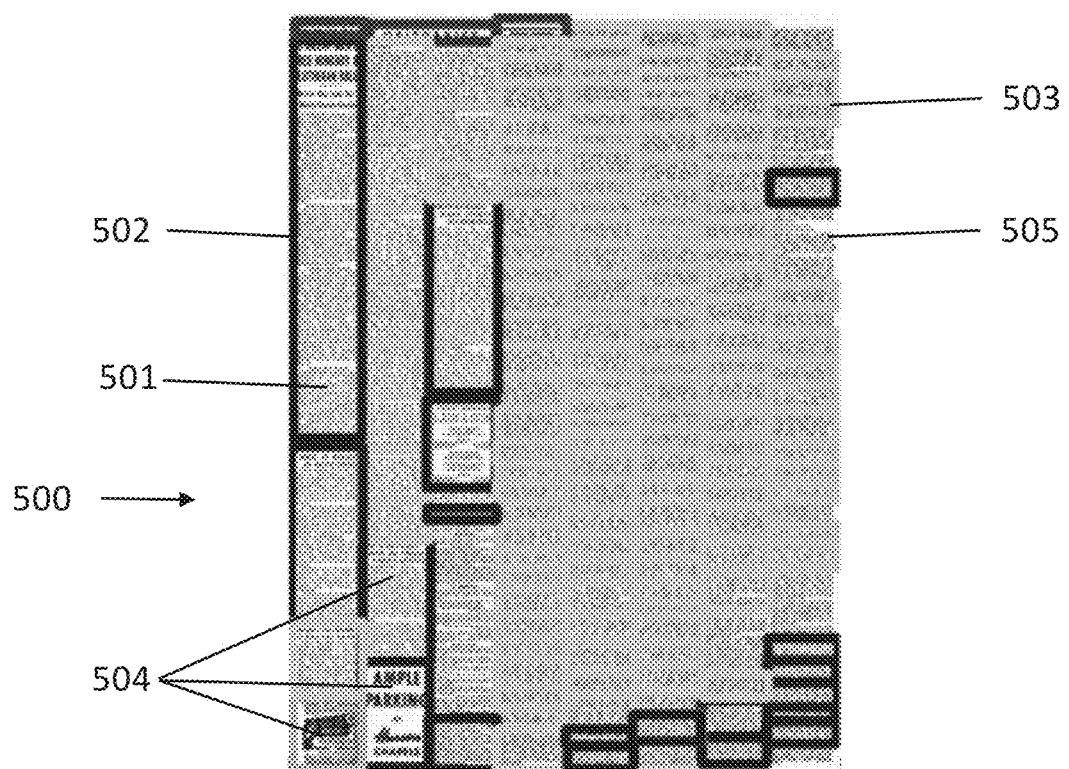
FIG. 5 is a segmented image after applying a conventional image-segmentation model.
Figure 6:
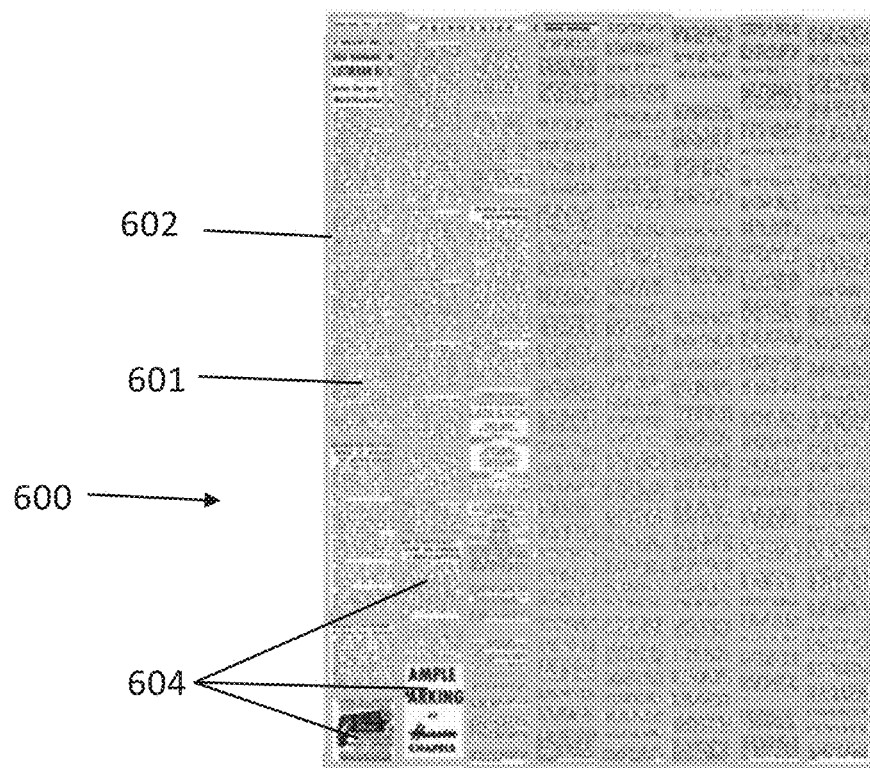
FIG. 6 is a segmented image after applying the system and method for identifying and segmenting objects according to the present disclosure.

Turning to FIG. 4, a segmented image 400 is shown, with a resized source image 401 overlaid with a grid 402 by a YOLO-based RPN module 122. The grid 402 defines distinct cells 403 across a substantial entirety of the resized source image 401. As seen, a plurality of cells 403 of the grid 402 may correspond to each particle 405. The RPN module 122 assigns each particle 405 to a particular grid cell 403 that is explicitly responsible for creating a region proposal. For instance, if a center of an object 405 falls into a grid cell 403, that grid cell 403 is responsible for detecting that object 405. Thus each object, in embodiments, falls into a single cell 403 of the 402. It has been found that due to the often more-even distribution of articles throughout an image of a historical document relative to natural scenery images in which there are comparatively few focal points, using a grid 402 facilitates the detection of more particles than is possible with, for example, RCNN-only approaches.

The proposal extraction module 123 receives bounding box proposals from the region proposal module 120 and is trained and configured to output features extracted from each candidate bounding box such that classification and bounding-box regression can be performed. The proposal extraction module 123 may utilize any suitable modality, such as RoIPool, to extract the features from each candidate box. RoIPool may extract and output a feature map from each candidate region of interest ("RoI").

The predictions module 130 receives the extracted features from the proposal extraction module 123 and comprises and/or cooperates with a classifier 131, a bounding box regressor 133, and a mask predictor 135 to output classifications 132, bounding box coordinates 134, and a mask 136, respectively. The predictions module 130 may utilize the existing Mask-RCNN architecture to perform these functions. For instance, the predictions module 130 outputs the binary mask 136 in parallel to the class prediction 132 and bounding box coordinates 134, which likewise may be performed in parallel relative to each other. The classifications 132, bounding boxes 134, and masks 136 advantageously identify and segment individual particles, such as articles, in an image, as shown in greater detail in FIGS. 2A, 2B.

The object or objects detected are classified into a type of object and a mask is created for the image comprising regions corresponding to identified particles and subparticles. The generated bounding boxes and masks 134, 136 are compared to ground truth, for example hand-labeled, bounding boxes and masks to determine whether the region-proposing module 120 can distinguish between the two, an adversarial loss process. If the region-proposing module 120 is able to distinguish between generated outputs and true labels, the system 100, in embodiments the bounding box regressor 133 in particular, is adjusted to generate output that more closely resembles the true labels.

It has been surprisingly found that by utilizing a generative task for segmentation with the addition of adversarial loss for making adjustments to the system and method embodiments, the system 100 can advantageously facilitate accurate region proposal and identification despite having only a small training dataset, e.g. a few thousand images only rather than millions of labeled images. This makes the system and method embodiments especially applicable and valuable when processing new types and collections of images, such as historical documents.

Providing an adversarial loss adjustment procedure advantageously allows for the use of a smaller dataset for training the system and method embodiments, as a dataset comprising only a few thousand images can be used to accurately train the system and method rather than requiring several million labeled images per existing models.

Figure 2A:
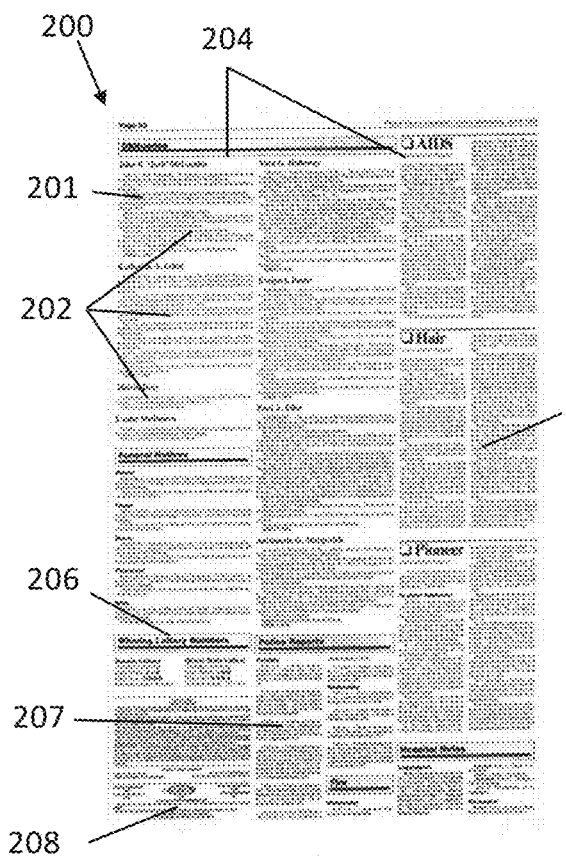
FIG. 2A is a raw image before applying the system and method for identifying and segmenting objects according to the present disclosure.
Figure 2B:
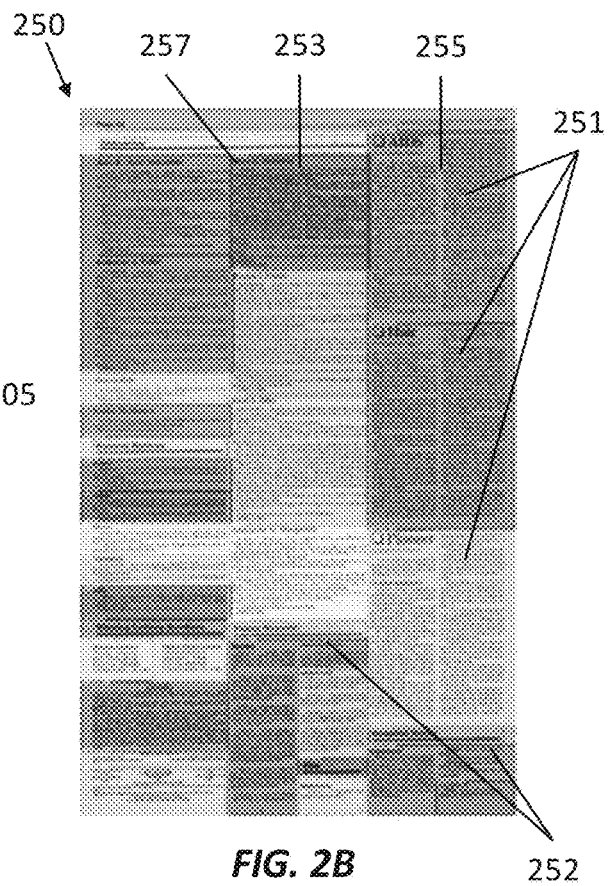
FIG. 2B is a segmented image after applying the system and method for identifying and segmenting objects according to the present disclosure.

FIG. 2A shows a raw image 200 of a historical document, comprising a page 201 of a newspaper. The page 201 comprises a plurality of individual articles 202 organized loosely into sections 204 (e.g. Obituaries, Police Reports, Hospital Notes, and continued articles from other pages). The articles 202 may take the form of prominent articles 205 and/or small articles 206, including certain non-rectangular or irregularly shaped articles 207. After processing the raw image 200 through the system and method embodiments of the disclosure, the raw image 200 is transformed to a segmented image 250 as seen in FIG. 2B. The segmented image 250 comprises identified articles 251 defined by or defining bounding boxes 253, masks 255, and classifications 257 identifying the type of particle, for example "obit," "article," "other," or other suitable classifications.

It will be appreciated while a newspaper page has been shown and described, the disclosure is not limited thereto and any suitable document or image may be segmented using the described method and system embodiments. Additionally, any suitable classification may be utilized. For example, in embodiments in which the system and method embodiments are directed to a Census record, the classifications may include fields such as "name," "relation," "personal description," "place of birth," etc.

The accuracy of the method and system embodiments of the disclosure is further enhanced by the use of a generative perspective of article segmentation and bounding box creation. The output of the system 100 is conditioned on the raw source image 111, and the generated bounding boxes 134 and masks 136, i.e. the results of a generative process, are compared in a discriminator 140 to hand-labeled bounding boxes and masks to see if the system can distinguish between the two. This distinguishing phase is an adversarial loss process. If the system 100 is able to distinguish between the hand-labeled bounding boxes and masks and the generated bounding boxes and masks 135, 137, the system is adjusted to generate output that more closely resembles the ground truth labels.

The system 100 comprises a discriminator 140 configured to output a degree of confidence regarding predictions vis-a-vis ground truth by identifying factors that contribute to the uncertainty of the system 100 of whether a proposal is from hand-labeled images or from a predicted proposal. As confidence predictions are generally differentiable, the discriminator 140 will continue, in embodiments, to push the model weights in even a 98% confidence model until the prediction is 100%. That is, the system 100 will identify regions that contributed to the 2% uncertainty and attempt to modify the same. In embodiments, a threshold of 0.1% uncertainty, 1% uncertainty, or other suitable threshold may be tolerated. The generative process is any component and/or step that results in creating output, such as bounding box coordinates and masks, that can be compared to ground truth, e.g. hand-labeled data.

Figure 8A:
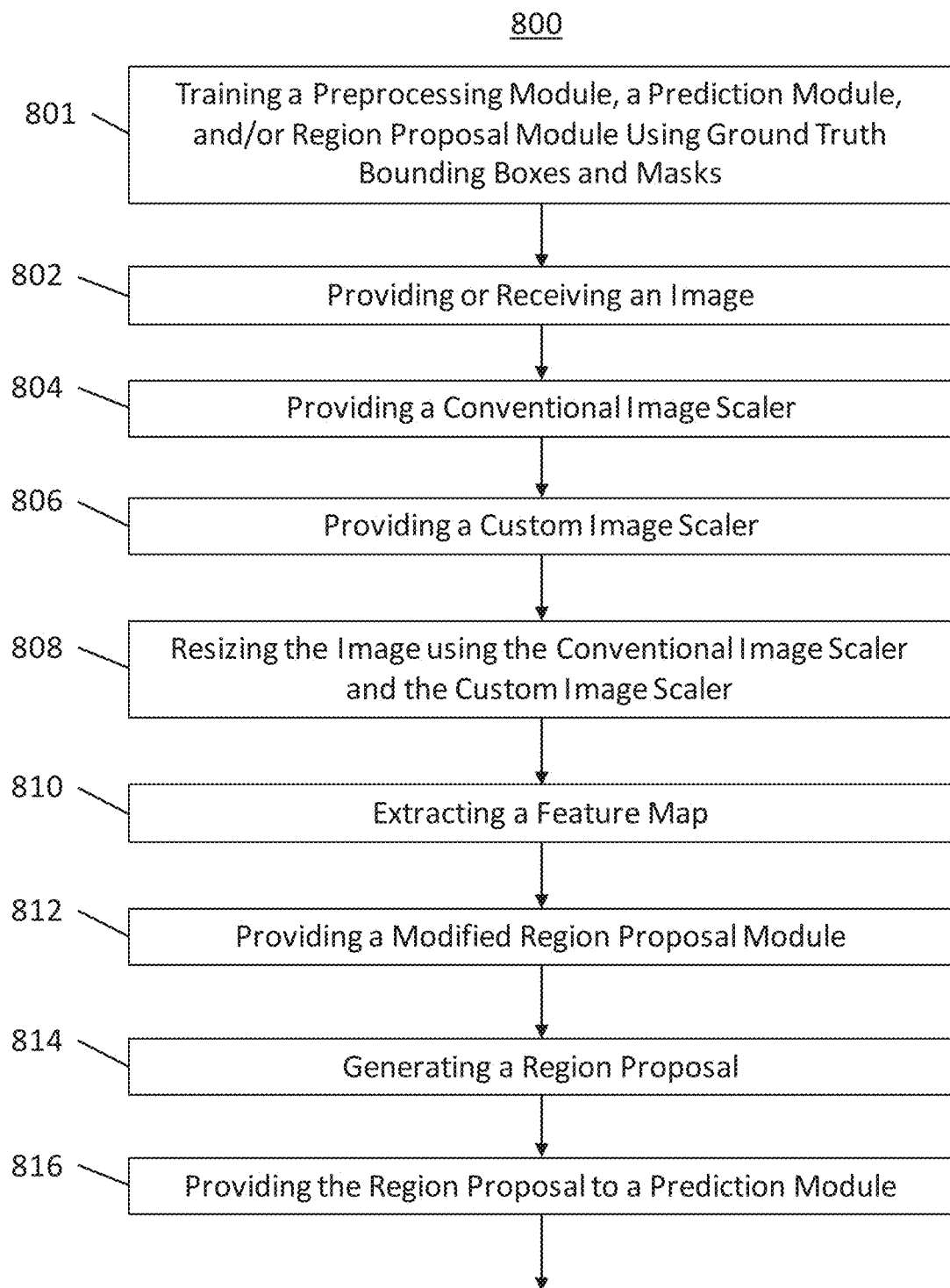
FIG. 8A is a diagram of a method for identifying and segmenting objects according to the disclosure.
Figure 8B:
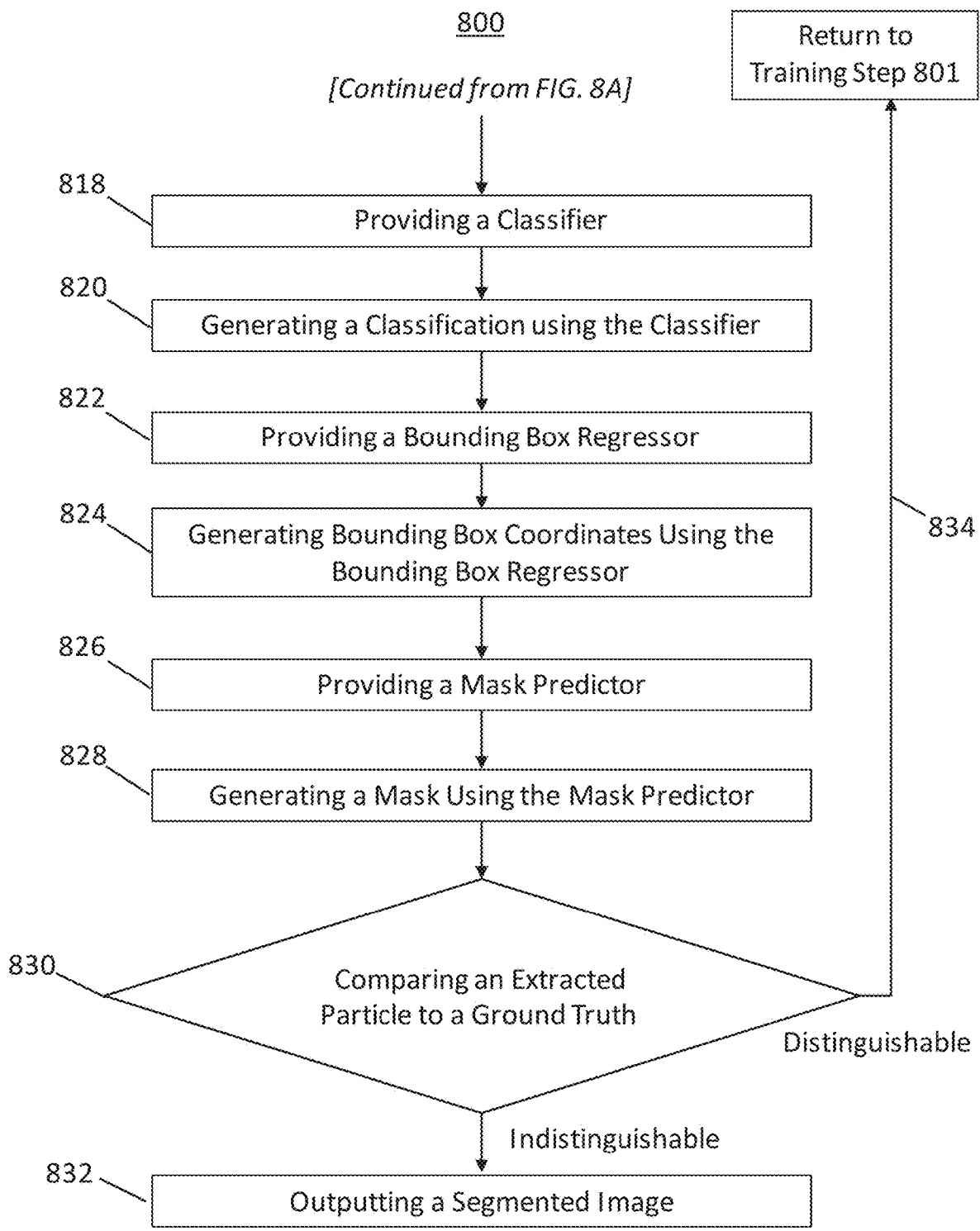
FIG. 8B is a diagram of the method for identifying and segmenting objects according to FIG. 8A.

Turning now to FIGS. 8A and 8B, a method 800 of identifying and segmenting objects from an image is shown and described. While certain steps and procedures are described, it will be appreciated that the inclusion of the depicted steps and the depicted order thereof is merely exemplary, and other configurations, combinations of steps, and permutations are contemplated in the present disclosure.

A step 801 involves training a prediction module and/or a region proposal module using ground truth, for example hand-labeled, images including, in embodiments, bounding boxes and masks. The hand-labeled bounding boxes and masks define a ground truth for the system and method embodiments, and may be provided in any suitable number and variety and from any suitable source. The step 801 may be performed prior to executing the method 800, while executing the method 800, and/or after executing the method 800. The step 801 may be performed when training the system, and separately from use of the system, e.g. subsequent steps of the method 800.

In embodiments, the step 801 involves providing a training dataset of approximately 4,000 ground truth images, which may be more or fewer in embodiments. The ground truth images may be directed entirely to historical documents or may comprise a variety of images. In embodiments, the ground truth images comprise images of historical documents of a single class, for example segmented newspaper images or Census records. Even when the ground truth images are from a single class, the training dataset may include a variety of images, such as a book cover, title page, and Census table form, for example. In other embodiments, the ground truth images comprise images from two or more classes of historical documents.

The step 801 involves, in embodiments, training the system end-to-end. That is, the modules of the system, including the preprocessing module, the region-proposal module, and the predictions module, are trained simultaneously with the whole architecture of the system treated as a single network. Gradients are backpropagated all the way back to the learned image scaler module, i.e. the custom image scaler.

It has been surprisingly found that the architecture of the system, including the preprocessing, region proposal, and prediction modules, can be trained end-to-end despite relatively small datasets, for example 5,000 images, because of the unique combination of conventional and customized modules.

That is, small datasets are possible, in embodiments, due to the use in system and method embodiments of pretrained backbone models that were trained on millions of non-historical document images; as a result, the system and method embodiments can be fine-tuned for historical document processing with a small dataset. This further avoids the risk of overfitting the system and method embodiments to a particular class of historical documents, such as newspaper pages. In alternative embodiments, one or more of the individual modules of the system are trained separately while one or more modules are trained together. Alternatively, each module is trained separately, for example using different datasets.

The step 801 may involve adjusting hyperparameters of one or more modules as necessary. The hyperparameters of the base Mask-RCNN architecture are left unchanged in embodiments, with a notable exception being the number of ROIs considered for bounding box refinement/classification. In embodiments, the number of ROIs considered is increased to accommodate the number of ROIs that potentially may occur in historical documents. Additionally or alternatively, the intersection over union ("IOU") threshold for pairing predictions with ground truth during training is increased. This advantageously mitigates the risk that, if the threshold is too low, small newspaper articles (for example) may get paired incorrectly during training.

In embodiments, the step 801 includes adjusting at least a bounding box regressor of a prediction module. For example, upon determining that the segmented images and/or extracted particles are distinguishable from a ground-truth segmented image and/or extracted particle, the step 801 of training the prediction module and/or the region proposal module is repeated, in embodiments with the bounding box regressor component of the prediction module adjusted.

The step 801 may be repeated as many times as necessary until the segmented images and/or extracted particles are indistinguishable or substantially indistinguishable from ground truth. In embodiments, the step 801 of training the system may be repeated until segmented images and/or extracted particles are sufficiently similar to ground truth. In embodiments, "sufficiently similar" is a precision of approximately 80%, for example 81%, and/or a recall of approximately 75%, for example 76%. Higher or lower thresholds for precision and/or recall may be utilized as suitable.

The step 801 may further include providing a validation dataset comprising approximately 500 ground truth images, which may be more or fewer in embodiments, and in embodiments from the same general class as the training dataset. The validation dataset is used to measure performance throughout the training process, e.g. to determine how well the system and method embodiments handle data that has not been seen previously. The validation dataset is then or alternatively used to determine which model parameters perform best.

The step 801 may further include providing a test dataset comprising approximately 500 ground truth images, which may be more or fewer in embodiments, and in embodiments provided from the same general class as the training and validation datasets, though in embodiments the test dataset may be from a different class or combination of classes. The test dataset, which in embodiments comprises images that have never been used for training or validation of the system and method embodiments, is used to determine how accurately, i.e. in terms of precision and/or recall, the system and method embodiments perform.

A step 802 involves providing or receiving an image. In embodiments, the image is an image of a historical document. Such images frequently are text-specific or text-heavy and may have a large size, for example 2500×5000 or another size for which downsampling is usually required.

A step 804 involves providing a conventional image scaler. The conventional image scaler may be any suitable downsampling model known to persons skilled in the art, and often available from a source such as OpenCV, PIL, or other image processing libraries or tools. For example, the image scaler may be a downsampling interpolation model such as Nearest Neighbor resampling algorithm, a Bilinear resampling algorithm, a Hermite resampling algorithm, a Bell resampling algorithm, a Mitchell resampling algorithm, a Bicubic resampling algorithm, a Lanczos resampling algorithm, combinations or equivalents thereof, or any other suitable downsampling algorithm, including resampling algorithms known to skilled persons.

A step 806 involves providing a custom image scaler. The custom image scaler includes a custom machine learning model, in embodiments a convolutional neural network ("CNN"), trained end-to-end with the prediction module and/or the region proposal module for extracting text- and/or article-specific features from a historical document. The end-to-end training may be performed on a training set comprising training images, validation images, and test images. The training images comprise approximately 4,000 labeled ground-truth images with approximately 500 images for validation and 500 images for testing, with more or fewer images and different distributions of images being contemplated by the present disclosure. It will be appreciated that as few as, for example, 500 images may be used for testing, and as many as 5,000,000 images or more may be used in embodiments.

In embodiments where larger datasets of training images are provided/available, the training step 801 may involve training one or more of the modules from scratch. In such embodiments, the system and method embodiments may be utilized to visually cluster pages together and then build a hierarchy of common newspaper layouts.

The CNN comprises a large kernel size, e.g. 5×5, 7×7, 9×9, 11×11, or other suitable size, and a limited number of channels, for example three channels. The CNN also utilizes a relatively large stride, such as three or more. The use of the relatively large kernel and large stride advantageously reduces the size of the image outputs a filter for each image provided in the step 802 so as to facilitate efficient processing by, for example, a GPU, while also retaining features specific to text, per the training procedure for the CNN. The output of the CNN may be a 3-channel static image defining a filter that is configured to be combined with the output of a conventional image scaler modality. While a CNN with a large kernel size and large stride has been described, this merely exemplary and other suitable approaches may be utilized.

A step 808 involves resizing the image provided in step 802 using the conventional image scaler and the custom image scaler provided in steps 804, 806, respectively. The step 808 advantageously involves processing the image in parallel in both the conventional image scaler and the custom image scaler so as to reduce a size of the image while retaining text-specific and/or text-important features. The outputs from the conventional and custom image scalers are combined to yield a single resized, i.e. smaller, image that is suitable for processing in a GPU and in which the text features are not blurred beyond recognition but rather can be recognized and utilized for region proposal and segmentation purposes.

A step 810 involves extracting a feature map from the resized image from step 808 using a feature extractor modality known to persons skilled in the art. The feature extractor may be pre-trained. The feature map may define or comprise a plurality of filters or layers derived from the resized image.

A step 812 involves providing a modified region proposal module. The modified region proposal module may utilize a combination of different region proposal paradigms so as to capture the desired features of the image from the step 802 with both sufficient recall and precision, in contrast to existing approaches where models frequently sacrifice one for the other. The region proposal module comprises a modified Mask-RCNN algorithm configured to comprise and/or cooperate with a YOLO-based algorithm for region proposal. The modified region proposal module is configured to output at least one proposal including a proposed classification and bounding box coordinates. In a step 816, the proposal is provided to a prediction module.

A step 818 involves providing a classifier, while a step 820 involves using the classifier to generate a classification. A step 822 involves providing a bounding box regressor, and a step 824 involves using the bounding box regressor to generate and/or refine bounding box coordinates. A step 826 involves providing a mask predictor, and a step 828 involves using the mask predictor to generate a mask for the identified regions. The classifier, bounding box regressor, and mask predictor may be modeled generally after a Mask-RCNN implementation. In an exemplary embodiment, the bounding box regressor is modified so as to generate coordinates as a percentage of the original image dimensions.

An optional step 830 involves comparing an extracted particle, including a classification and bounding box generated at the steps 820, 824, against training data. The training data may include ground truth, e.g. hand-labeled, images with bounding boxes and/or classifications. The optional step 830 may be utilized, in particular, when training/validating a model according to embodiments of the disclosure and may be excluded when using a model according to embodiments post-training or post-validation.

When the extracted particle is distinguishable from the ground-truth, e.g. the hand-labeled bounding boxes and classifications, the method 800 may restart or resume 834 at, for example, the training step 801. The step 834 of restarting or resuming training may be repeated as frequently as necessary. When the segmented image and/or extracted particle is indistinguishable or substantially indistinguishable from the ground truth, e.g. by distinctions falling below a predetermined threshold, the segmented image and/or extracted particle is used in a step 832 of outputting a segmented image.

Figure 7:
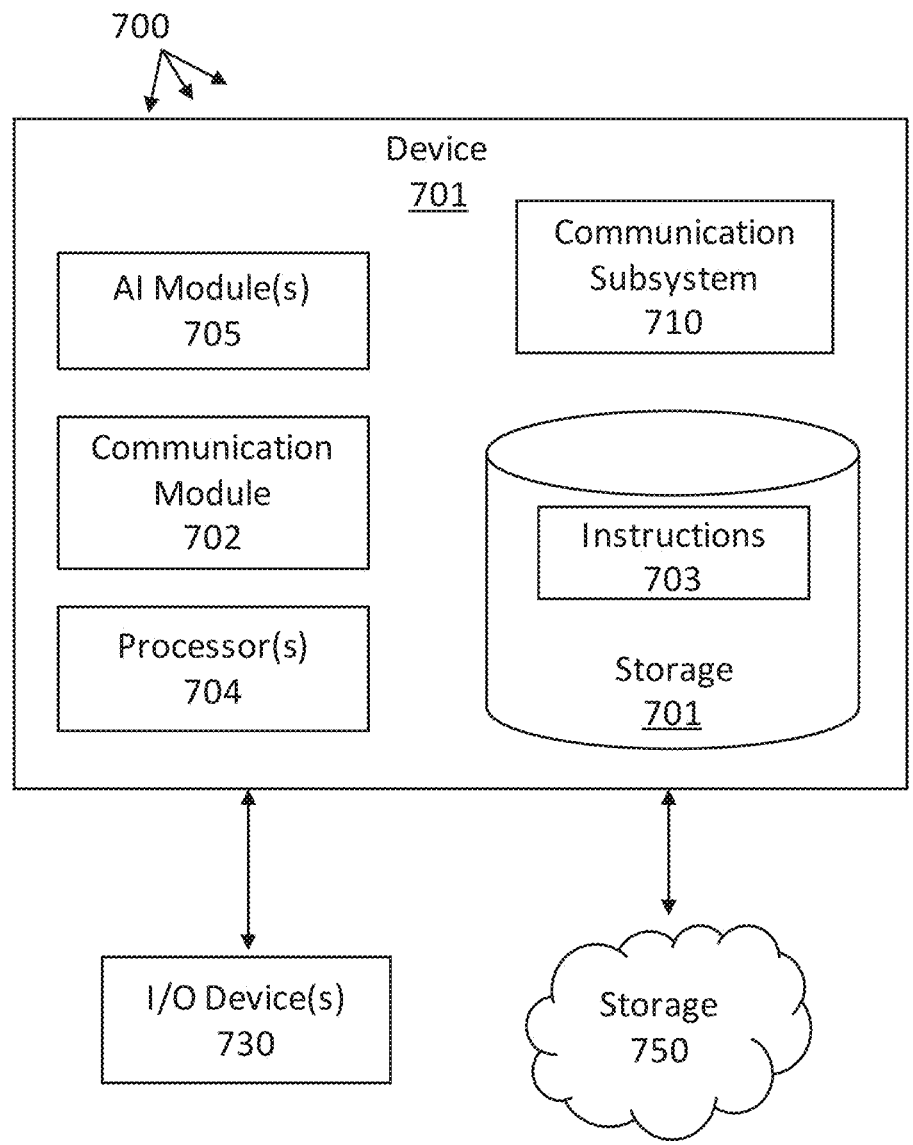
FIG. 7 is a diagram of a computer system for identifying and segmenting objects according to the present disclosure.

FIG. 7 illustrates an example computer system 700 comprising various hardware elements, in accordance with some embodiments of the present disclosure. The computer system 700 may be incorporated into or integrated with devices described herein and/or may be configured to perform some or all of the steps of the methods provided by various embodiments. For example, in various embodiments, the computer system 700 may be incorporated into the image segmentation system architecture 100. It should be noted that FIG. 7 is meant only to provide a generalized illustration of various components, any or all of which may be utilized as appropriate. FIG. 7, therefore, broadly illustrates how individual system elements may be implemented in a relatively separated or relatively more integrated manner.

In the illustrated example, the computer system 700 includes a communication module 702, one or more processor(s) 704, one or more input and/or output device(s) 730, and a storage 701 comprising instructions 703 for implementing a system and/or method according to the disclosure. The computer system 700 may be implemented using various hardware implementations and embedded system technologies. For example, one or more elements of the computer system 700 may be implemented as a field-programmable gate array (FPGA), such as those commercially available by XILINX®, INTEL®, or LATTICE SEMICONDUCTOR®, a system-on-a-chip (SoC), an application-specific integrated circuit (ASIC), an application-specific standard product (ASSP), a microcontroller, and/or a hybrid device, such as an SoC FPGA, among other possibilities.

The various hardware elements of the computer system 700 may be communicatively coupled via the communication module 702. While the communication module 702 is illustrated as a single connection for purposes of clarity, it should be understood that the communication module 702 may include various numbers and types of communication media for transferring data between pertinent components such as hardware elements. For example, the communication module 702 may include one or more wires (e.g., conductive traces, paths, or leads on a printed circuit board (PCB) or integrated circuit (IC), microstrips, striplines, coaxial cables), one or more optical waveguides (e.g., optical fibers, strip waveguides), and/or one or more wireless connections or links (e.g., infrared wireless communication, radio communication, microwave wireless communication), among other possibilities.

In some embodiments, the communication medium 702 may include one or more buses connecting pins of the hardware elements of the computer system 700. For example, the communication medium 702 may include a bus that connects the processor(s) 704 with the storage 701, referred to as a system bus, and a bus that connects the storage 701 with the input device(s) and/or output device(s) 730, referred to as an expansion bus. The system bus may itself consist of several buses, including an address bus, a data bus, and a control bus. The address bus may carry a memory address from the processor(s) 704 to the address bus circuitry associated with the storage 701 in order for the data bus to access and carry the data contained at the memory address back to the processor(s) 704. The control bus may carry commands from the processor(s) 704 and return status signals from the storage 701. Each bus may include multiple wires for carrying multiple bits of information and each bus may support serial or parallel transmission of data.

The processor(s) 704 may include one or more central processing units (CPUs), graphics processing units (GPUs), neural network processors or accelerators, digital signal processors (DSPs), and/or other general-purpose or special-purpose processors capable of executing instructions. A CPU may take the form of a microprocessor, which may be fabricated on a single IC chip of metal-oxide-semiconductor field-effect transistor (MOSFET) construction. The processor(s) 704 may include one or more multi-core processors, in which each core may read and execute program instructions concurrently with the other cores, increasing speed for programs that support multithreading.

The input device(s) 730 may include one or more of various user input devices such as a mouse, a keyboard, a microphone, as well as various sensor input devices, such as an image capture device, a pressure sensor (e.g., barometer, tactile sensor), a temperature sensor (e.g., thermometer, thermocouple, thermistor), a movement sensor (e.g., accelerometer, gyroscope, tilt sensor), a light sensor (e.g., photodiode, photodetector, charge-coupled device), and/or the like. The input device(s) 730 may also include devices for reading and/or receiving removable storage devices or other removable media. Such removable media may include optical discs (e.g., Blu-ray discs, DVDs, CDs), memory cards (e.g., CompactFlash card, Secure Digital (SD) card, Memory Stick), floppy disks, Universal Serial Bus (USB) flash drives, external hard disk drives (HDDs) or solid-state drives (SSDs), and/or the like.

The output device(s) 730 may include one or more of various devices that convert information into human-readable form, such as without limitation a display device, a speaker, a printer, a haptic or tactile device, and/or the like. The output device(s) 730 may also include devices for writing to removable storage devices or other removable media, such as those described in reference to the input device(s). The output device(s) 730 may also include various actuators for causing physical movement of one or more components. Such actuators may be hydraulic, pneumatic, electric, and may be controlled using control signals generated by the computer system 700.

The communications subsystem 710 may include hardware components for connecting the computer system 700 to systems or devices that are located external to the computer system 700, such as over a computer network. In various embodiments, the communications subsystem 710 may include a wired communication device coupled to one or more input/output ports (e.g., a universal asynchronous receiver-transmitter (UART)), an optical communication device (e.g., an optical modem), an infrared communication device, a radio communication device (e.g., a wireless network interface controller, a BLUETOOTH® device, an IEEE 802.11 device, a Wi-Fi device, a Wi-Max device, a cellular device), combinations thereof, or other suitable possibilities.

The storage 701 may include the various data storage devices of the computer system 700. For example, the storage 701 may include various types of computer memory with various response times and capacities, from faster response times and lower capacity memory, such as processor registers and caches (e.g., L0, L1, L2), to medium response time and medium capacity memory, such as random-access memory (RAM), to lower response times and lower capacity memory, such as solid-state drives and hard drive disks. While the processor(s) 704 and the storage 701 are illustrated as being separate elements, it should be understood that the processor(s) 704 may include varying levels of on-processor memory, such as processor registers and caches that may be utilized by a single processor or shared between multiple processors.

The storage 701 may include a main memory, which may be directly accessible by the processor(s) 704 via the memory bus of the communication module 702. For example, the processor(s) 704 may continuously read and execute instructions stored in the main memory. As such, various software elements may be loaded into the main memory so as to be read and executed by the processor(s) 704 as illustrated in FIG. 7. Typically, the main memory is volatile memory, which loses all data when power is turned off and accordingly needs power to preserve stored data. The main memory may further include a small portion of non-volatile memory containing software (e.g., firmware, such as BIOS) that is used for reading other software stored in the storage 701 into the main memory. In some embodiments, the volatile memory of the main memory is implemented as RAM, such as dynamic random-access memory (DRAM), and the non-volatile memory of the main memory is implemented as read-only memory (ROM), such as flash memory, erasable programmable read-only memory (EPROM), or electrically erasable programmable read-only memory (EEPROM).

The computer system 700 may include software elements, shown as being currently located within the main memory, which may include an operating system, device driver(s), firmware, compilers, and/or other code, such as one or more application programs, which may include computer programs provided by various embodiments of the present disclosure. Merely by way of example, one or more steps described with respect to any methods discussed above, may be implemented as instructions 703, which are executable by the computer system 700. In one example, such instructions 703 may be received by the computer system 700 using the communications subsystem 710 (e.g., via a wireless or wired signal that carries the instructions 703), carried by the communication module 702 to the storage 701, stored within the storage 701, read into the main memory, and executed by the processor(s) 704 to perform one or more steps of the described methods. In another example, the instructions 703 may be received by the computer system 700 using the input device(s) 130 (e.g., via a reader for removable media), carried by the communication module 702 to the storage 701, stored within the storage 701, read into the main memory, and executed by the processor(s) 704 to perform one or more steps of the described methods.

In some embodiments of the present disclosure, the instructions 703 are stored on a computer-readable storage medium (or simply computer-readable medium). Such a computer-readable medium may be a hardware storage device that, compared to transmission media or carrier waves, is "non-transitory" and may therefore be referred to as a non-transitory computer-readable medium. In some cases, the non-transitory computer-readable medium may be incorporated within the computer system 700. For example, the non-transitory computer-readable medium may be the storage 701 and/or the cloud storage 750 (as shown in FIG. 7).

In some cases, the non-transitory computer-readable medium may be separate from the computer system 700. In one example, the non-transitory computer-readable medium may be a removable medium provided to the input device(s) 730 (as shown in FIG. 7), such as those described in reference to the input device(s) 730, with the instructions 703 being read into the computer system 700 from the input device(s) 730. In another example, the non-transitory computer-readable medium may be a component of a remote electronic device, such as a mobile phone, that may wirelessly transmit a data signal that carries the instructions 703 to the computer system 700 and that is received by the communications subsystem 710 (as shown in FIG. 7).

The instructions 703 may take any suitable form to be read and/or executed by the computer system 700. For example, the instructions 703 may be source code (written in a human-readable programming language such as Java, C, C++, C#, Python), object code, assembly language, machine code, microcode, executable code, and/or the like. In one example, the instructions 703 are provided to the computer system 700 in the form of source code, and a compiler is used to translate the instructions 703 from source code to machine code, which may then be read into the main memory for execution by the processor(s) 704. As another example, instructions 703 are provided to the computer system 400 in the form of an executable file with machine code that may immediately be read into the main memory for execution by processor(s) 704. In various examples, the instructions 703 may be provided to the computer system 700 in encrypted or unencrypted form, compressed or uncompressed form, as an installation package or an initialization for a broader software deployment, among other possibilities.

In one aspect of the present disclosure, a system (e.g., the computer system 700) is provided to perform methods in accordance with various embodiments of the present disclosure. For example, some embodiments may include a system comprising one or more processors (e.g., the processor(s) 704) that are communicatively coupled to a non-transitory computer-readable medium (e.g., the storage 701). The non-transitory computer-readable medium may have instructions (e.g., the instructions 703) stored thereon that, when executed by the one or more processors, cause the one or more processors to perform the methods or aspects thereof as described in the various embodiments.

In another aspect of the present disclosure, a computer-program product that includes instructions (e.g., instructions 703) is provided to perform methods in accordance with various embodiments of the present disclosure. The computer-program product may be tangibly embodied in a non-transitory computer-readable medium (e.g., the storage 701). The instructions may be configured to cause one or more processors (e.g., the processor(s) 704) to perform the methods or aspects thereof as described in the various embodiments.

In another aspect of the present disclosure, a non-transitory computer-readable medium (e.g., the storage 701) is provided. The non-transitory computer-readable medium may have instructions (e.g., instructions 703) stored thereon that, when executed by one or more processors (e.g., processor(s) 704), cause the one or more processors to perform the methods or aspects thereof as described in the various embodiments.

It is to be understood that not necessarily all objects or advantages may be achieved under any embodiment of the disclosure. Those skilled in the art will recognize that the system and method for identifying and segmenting objects from images may be embodied or carried out, so it achieves or optimizes one advantage or group of advantages as taught herein without necessarily achieving other objects or advantages as taught or suggested herein.

The skilled artisan will recognize the interchangeability of various disclosed features. Besides the variations described, other known equivalents for each feature can be mixed and matched by one of skill in this art to provide or utilize a system and/or method for identifying and segmenting objects from images under principles of the present disclosure. It will be understood by the skilled artisan that the features described may apply to other types of images, contexts, and/or models.

Although this disclosure describes certain exemplary embodiments and examples of a system and method for identifying and segmenting images, it nevertheless will be understood by those skilled in the art that the present disclosure extends beyond the specifically disclosed embodiments to other alternative embodiments and/or uses of the disclosure and obvious modifications and equivalents thereof. It is intended that the scope of the present disclosure should not be limited by the particular disclosed embodiments described above, and may be extended to other uses, approaches, and contexts for image analysis, and other applications that may employ the features described herein.

The invention claimed is:

1. A system for identifying and segmenting objects from images, the system comprising:
   one or more memory devices storing a preprocessing module, a region-proposal module, and a prediction module; and
   at least one processor coupled to the one or more memory devices, the at least one processor configured to perform operations comprising:

generating, utilizing the preprocessing module, a resized historical document image from a source historical document image;

determining, utilizing the region-proposal module, one or more regions of interest in the resized historical document image; and generating, utilizing the prediction module to process pixels of the resized historical document image indicated by the one or more regions of interest, a predicted object defined by a classification and a set of bounding box coordinates within the resized historical document image.

2. The system of claim 1, wherein:

the preprocessing module comprises a first image resizing model that applies a first resizing algorithm and a second image resizing model that applies a second resizing algorithm; and generating the resized historical document image comprises utilizing the first resizing algorithm and the second resizing algorithm to resize the source historical document image.

3. The system of claim 2, wherein the second resizing algorithm comprises a convolutional neural network that generates a filter corresponding to the source historical document image.

4. The system of claim 3, wherein generating the resized historical document image comprises:

generating an intermediate resized historical document image utilizing the first resizing algorithm; and combining the filter and the intermediate resized historical document image to generate the resized historical document image.

5. The system images of claim 1, wherein the preprocessing module further comprises an image feature extractor configured to extract a feature map from the resized historical document image.

6. The system of claim 1, wherein the region-proposal module comprises a first region-proposal algorithm for a two-stage region proposal neural network and a second region-proposal algorithm adapted from a single-stage region proposal neural network.

7. The system of claim 6, wherein the first region-proposal algorithm is a region proposal network adapted from a region-based convolutional neural network (RCNN) algorithm and the second region-proposal algorithm is a region proposal network adapted from a you only look once (YOLO) based algorithm.

8. The system of claim 6, wherein determining the one or more regions of interest comprises utilizing the first region-proposal algorithm and the second region-proposal algorithm in parallel.

9. The system of claim 1, wherein generating the predicted object comprises segmenting objects within the resized historical document image utilizing the prediction module.

10. The system of claim 1, wherein the prediction module comprises a classifier, a bounding box regressor, and a mask predictor.

11. The system of claim 1, wherein the preprocessing module comprises a convolutional neural network having a kernel size through at least one layer of at least 7×7.

12. The system of claim 11, wherein the convolutional neural network comprises a stride through at least one layer of at least 5.

13. The system of claim 12, wherein a stride size of the convolutional neural network is less than a kernel size of the convolutional neural network.

14. A computer-implemented method comprising:

generating, utilizing a preprocessing module, a resized historical document image from a source historical document image;

determining, utilizing a region-proposal module comprising a combination of two region proposal models, one or more regions of interest in the resized historical document image; and generating, utilizing a prediction module to process pixels of the resized historical document image indicated by the one or more regions of interest, a predicted object defined by a classification and a set of bounding box coordinates within the resized historical document image.

15. The computer-implemented method of claim 14, wherein generating the resized historical document image comprises utilizing a first resizing algorithm and a second resizing algorithm of the preprocessing module to resize the source historical document image.

16. The computer-implemented method of claim 14, wherein generating the predicted object comprises segmenting objects within the resized historical document image utilizing the prediction module.

17. A non-transitory computer readable medium storing instructions which, when executed by at least one processor, cause the at least one processor to:

generate, utilizing a preprocessing module comprising a learned image scaler, a resized historical document image from a source historical document image;

determine, utilizing a region-proposal module, one or more regions of interest in the resized historical document image; and generate, utilizing a prediction module to process pixels of the resized historical document image indicated by the one or more regions of interest, a predicted object defined by a classification and a set of bounding box coordinates within the resized historical document image.

18. The non-transitory computer readable medium of claim 17, further comprising instructions which, when executed by the at least one processor, cause the at least one processor to generate a region proposal within resized historical document image by utilizing a region-proposal neural network as part of the region-proposal module.

19. The non-transitory computer readable medium of claim 18, further comprising instructions which, when executed by the at least one processor, cause the at least one processor to:

generate a bounding box coordinate utilizing a bounding box regressor;

generate an image mask for a bounding box defined by the bounding box coordinate utilizing a mask predictor; and generate a segmented historical document image reflecting the image mask.

20. The non-transitory computer readable medium of claim 18, further comprising instructions which, when executed by the at least one processor, cause the at least one processor to generate the resized historical document image by utilizing a first resizing algorithm and a second resizing algorithm of the preprocessing module to resize the source historical document image.

* * * * *